US008245881B2

(12) United States Patent
Ophardt

(10) Patent No.: US 8,245,881 B2
(45) Date of Patent: Aug. 21, 2012

(54) SPRING FORCE ADJUSTMENT SYSTEM

(75) Inventor: Heiner Ophardt, Vineland (CA)

(73) Assignee: Gotohti.com Inc, Ontario (CA)

( * ) Notice: Subject to any disclaimer, the term of this patent is extended or adjusted under 35 U.S.C. 154(b) by 494 days.

(21) Appl. No.: 12/457,008

(22) Filed: May 29, 2009

(65) Prior Publication Data

US 2009/0302061 A1 Dec. 10, 2009

(30) Foreign Application Priority Data

Jun. 5, 2008 (CA) ...................................... 2633837

(51) Int. Cl.
*B67D 7/06* (2010.01)
*G01F 11/00* (2006.01)
*B65D 88/54* (2006.01)

(52) U.S. Cl. .................. 222/181.3; 222/181.1; 222/325; 222/336

(58) Field of Classification Search .... 222/181.1–181.3, 222/321.7–321.9, 325, 336
See application file for complete search history.

(56) References Cited

U.S. PATENT DOCUMENTS

| | | | | |
|---|---|---|---|---|
| 5,373,970 | A | 12/1994 | Ophardt | |
| 5,431,309 | A | 7/1995 | Ophardt | |
| 5,465,877 | A * | 11/1995 | Bell et al. | 222/181.2 |
| 5,676,277 | A | 10/1997 | Ophardt | |
| 6,540,117 | B2 * | 4/2003 | Powling | 222/341 |
| 7,232,045 | B2 | 6/2007 | Ophardt et al. | |
| 7,234,612 | B2 | 6/2007 | Ophardt | |
| 7,270,250 | B2 | 9/2007 | Jones et al. | |
| 7,367,477 | B2 | 5/2008 | Ophardt et al. | |
| 7,527,171 | B2 | 5/2009 | Ophardt et al. | |
| 7,568,598 | B2 | 8/2009 | Ophardt et al. | |
| 2008/0121659 | A1 | 5/2008 | Ophardt | |

* cited by examiner

*Primary Examiner* — Darren W Gorman
(74) *Attorney, Agent, or Firm* — Thorpe North & Western LLP

(57) ABSTRACT

A fluid dispenser comprising a dispensing mechanism, a housing and a container having an interior. The container is removably coupled to the housing for dispensing fluid from the container by the dispensing mechanism.

18 Claims, 18 Drawing Sheets

FIG 17
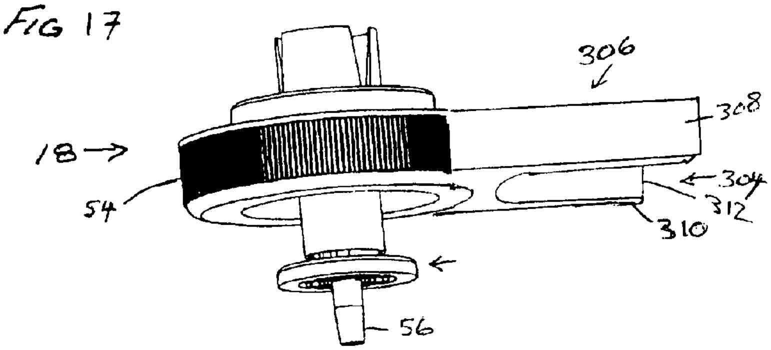
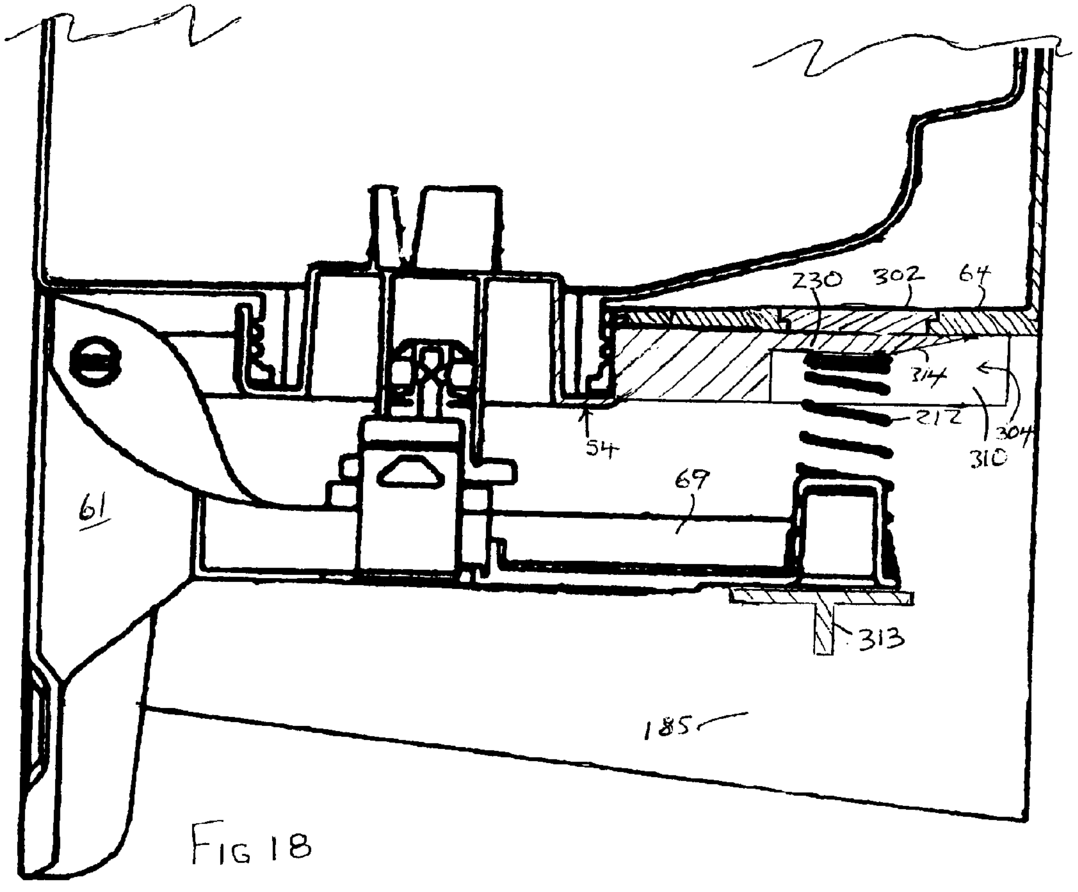
FIG 18

SPRING FORCE ADJUSTMENT SYSTEM

SCOPE OF THE INVENTION

This invention relates to a spring biased activation unit and, more particularly, to an apparatus, preferably a fluid dispenser, in which the extent to which a spring is biased in operation can be adjusted.

BACKGROUND OF THE INVENTION

Dispensers are known which have a housing to receive a removable and replaceable fluid container from which fluid is to be dispensed and in which dispensing requires the compression and expansion of a spring.

Such dispensers include dispensers in which a piston pump is returned to one of an extended and retracted position due to the inherent tendency of a spring to return toward an inherent undeflected configuration. Known dispensers use the same spring forces for dispensing whether or not different fluids are to be dispensed. The present inventor has appreciated the disadvantage that in any given dispenser, different spring forces may be useful to dispense different fluids, and for different operation.

The present inventor has also appreciated the disadvantage that some dispensers permit the use of a wide variety of replaceable fluid containers including those which may not be desired for use with a particular dispenser.

SUMMARY OF THE INVENTION

To at least partially overcome these disadvantages of previously known devices the present invention provides an arrangement in which the spring forces exerted by a spring on an activation unit may be varied. In accordance with the present invention, there is provided a resilient spring having a first end and a second end across which forces may be applied. The distance between the first end and the second end of the spring is permitted to be varied by providing for the ends of the springs to be contacted at different relative distances from each other so as to selectively set the extent that the spring is deflected against its bias in use.

An object of the present invention is to provide an improved spring biased actuator preferably in a fluid dispenser.

In one aspect, the present invention provides a dispensing system comprising:

a housing member, an activation member mounted to a housing member to be reciprocally movable relative the housing between a first position and a second position, a spring member disposed between the housing member and the activation member biasing the activation member from the first position toward the second position and resisting movement of the activation member from the second position toward the first position, the spring member being elongate and extending between a first end of the spring in engagement with the housing member and a second end of the spring in engagement with the activation member, the spring having a length measured along a spring longitudinal between the first end and the second end, the spring having an inherent bias to assume an inherent length and to resist deflection by forces applied between the first end and the second end along the spring longitudinal, the relative forces applied between the first end and the second end along the longitudinal which are required to change the length of the spring member a given amount varying as the length of the length of the spring member changes, a spring seat member selected from one or more of:

(a) a first housing spring seat member carried on the housing member disposed between the housing member and the first end of the spring member to engage the first end of the spring and couple the first end of the spring at a first housing distance along the spring longitudinal relative the housing member, the first housing spring seat member removably coupled to the housing member for replacement by a similar second housing spring seat member to be disposed between the housing member and the first end of the spring member to engage the first end of the spring and couple the first end of the spring at a second housing distance along the spring longitudinal relative the housing member which second housing distance may be the same as or different than the first housing distance, and (b) a first activation housing spring seat member carried on the activation member disposed between the activation member and the second end of the spring member to engage the second end of the spring and couple the second end of the spring at a first activation distance along the spring longitudinal relative the activation member, the first activation spring seat member removably coupled to the activation member for replacement by a similar second activation spring seat member to be disposed between the activation member and the second end of the spring member to engage the second end of the spring and couple the second end of the spring at a second activation distance along the spring longitudinal relative the activation member which second activation distance may be the same as or different than the first activation distance.

DETAILED DESCRIPTION OF THE DRAWINGS

Further aspects and advantageous of the present invention will become apparent from the following description taken together with the accompanying drawings in which:

FIG. 17 is a perspective view similar to FIG. 14 but of a third embodiment of a pump mechanism carrying a spring seat member;

FIG. 18 is a schematic cross-sectional side view similar to FIG. 15 but showing use of the third embodiment of a pump mechanism shown in FIG. 17;

DETAILED DESCRIPTION OF THE DRAWINGS

Figure 1:
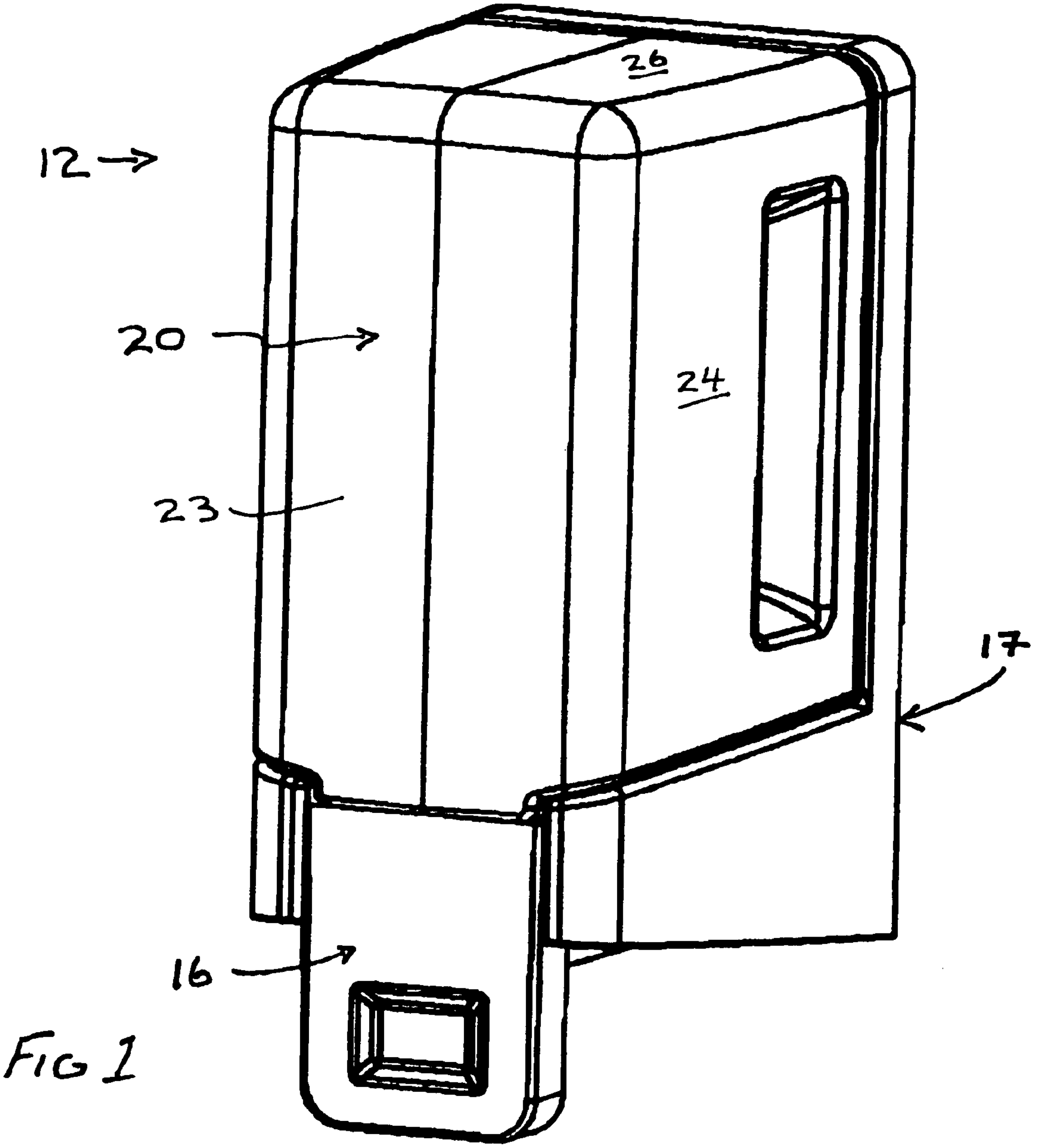
FIG. 1 is a front perspective view of a dispenser in accordance with a first embodiment of the invention.

Reference is made to FIG. 1 which shows a dispensing unit 12 adapted to be removably coupled to a wall not shown. The dispensing unit 12 comprises an assembly of a reservoir container or bottle 20, a piston pump mechanism 18, a housing member 17 and an activation member 16.

Figure 2:
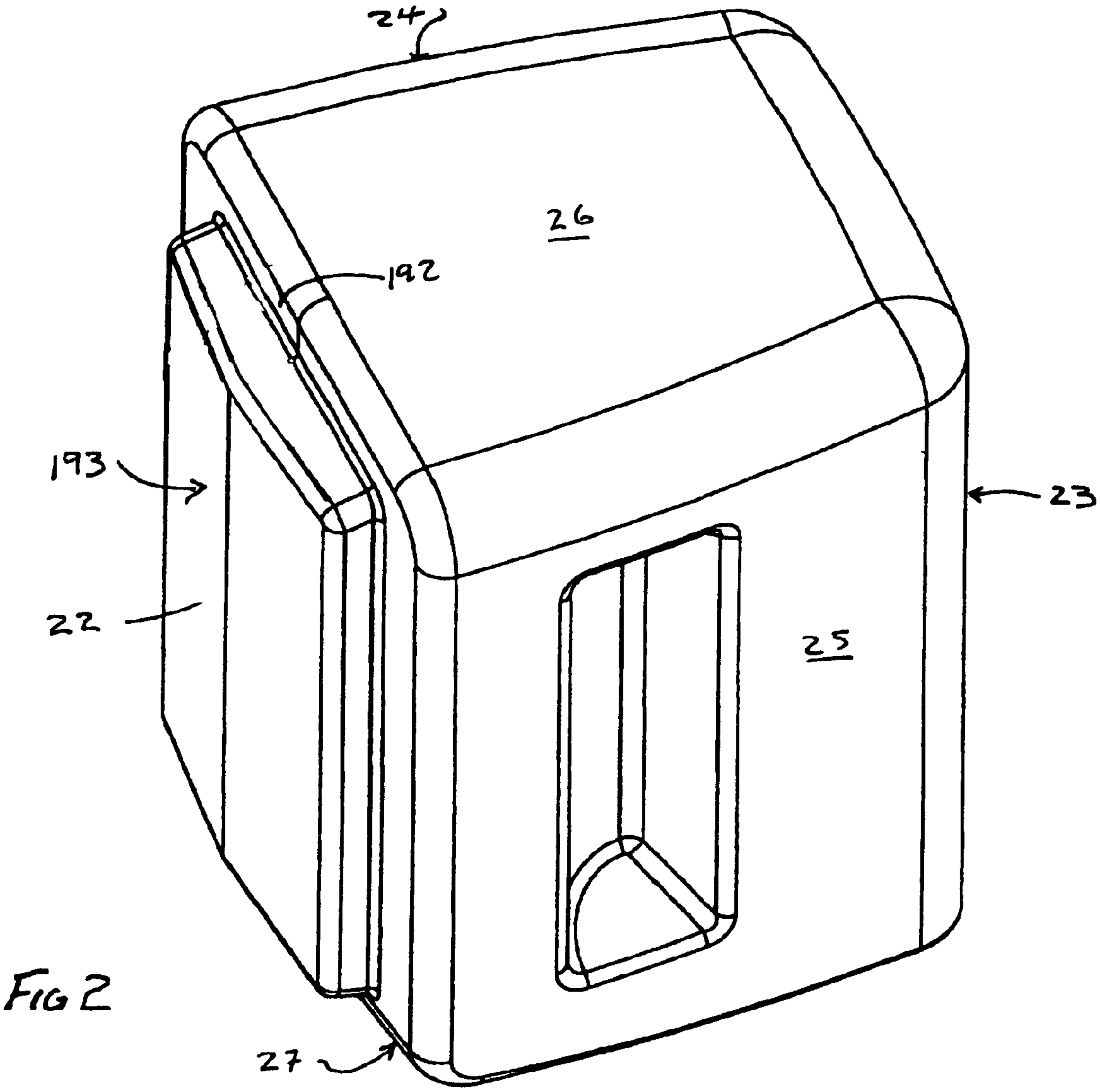
FIG. 2 is a side perspective view of the bottle of FIG. 1.
Figure 3:
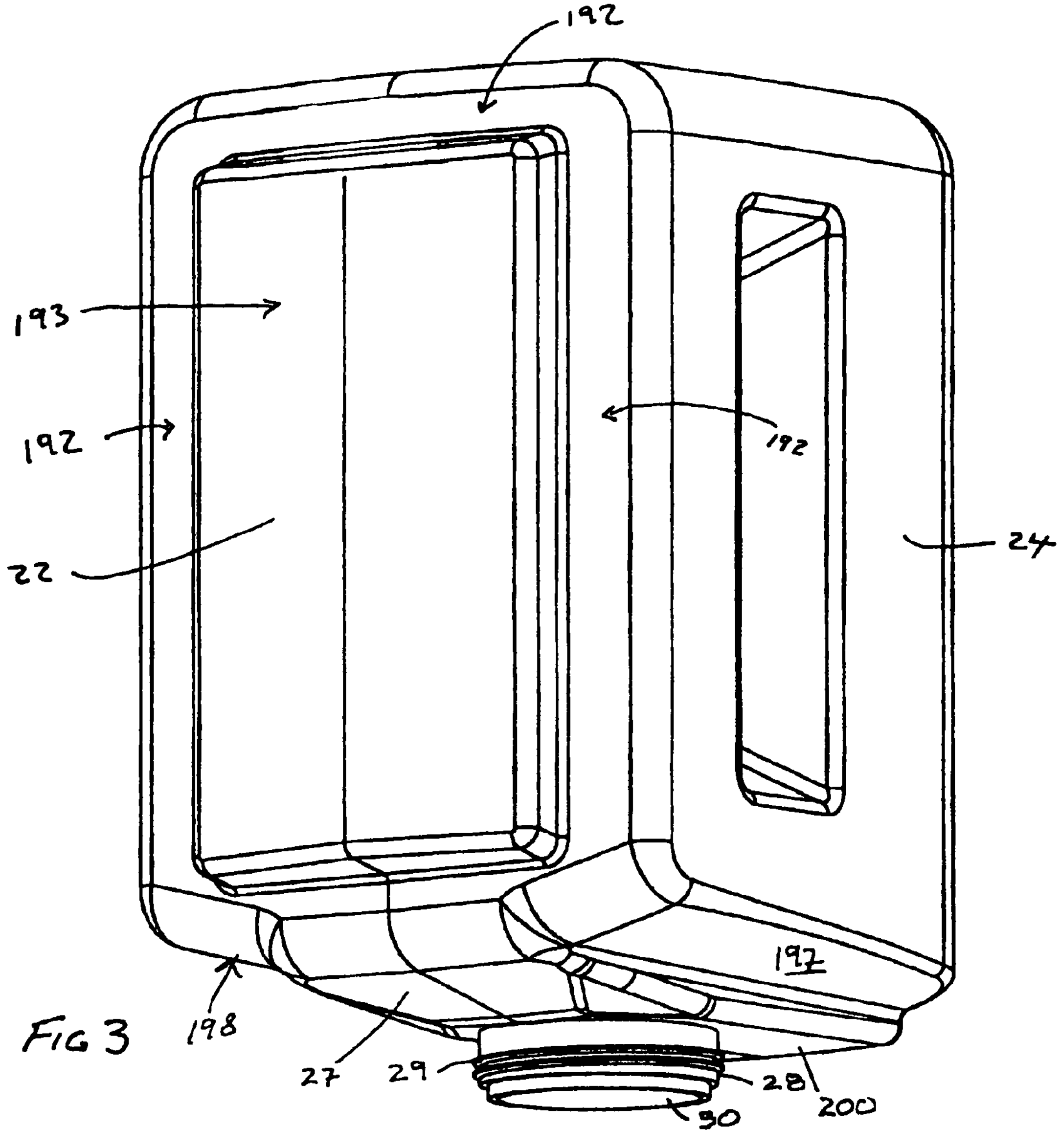
FIG. 3 is a rear perspective view of the bottle of FIG. 2.

As seen in FIGS. 2 and 3, the bottle 20 has a rear wall 22, a forward wall 23, two sidewalls 24 and 25, a top wall 26 and a bottom wall 27. A cylindrical externally threaded neck 28 carrying helical threads 29 extends downwardly from the bottom wall 27 and provides an exit outlet 30 for communication with the interior of the container. As seen in FIGS. 2 and 3, the bottom wall 27 of the bottle 20 has two downwardly directed side flange portions 197 and 198 extending from the front to the rear and a central bottom locating plug 200 extending downwardly therefrom from which the neck 28 extends centrally downwardly. The rear wall 22 of the bottle 20 has a rear locating plug 193 extending rearwardly from a peripheral rear shoulder 192.

Figure 8:
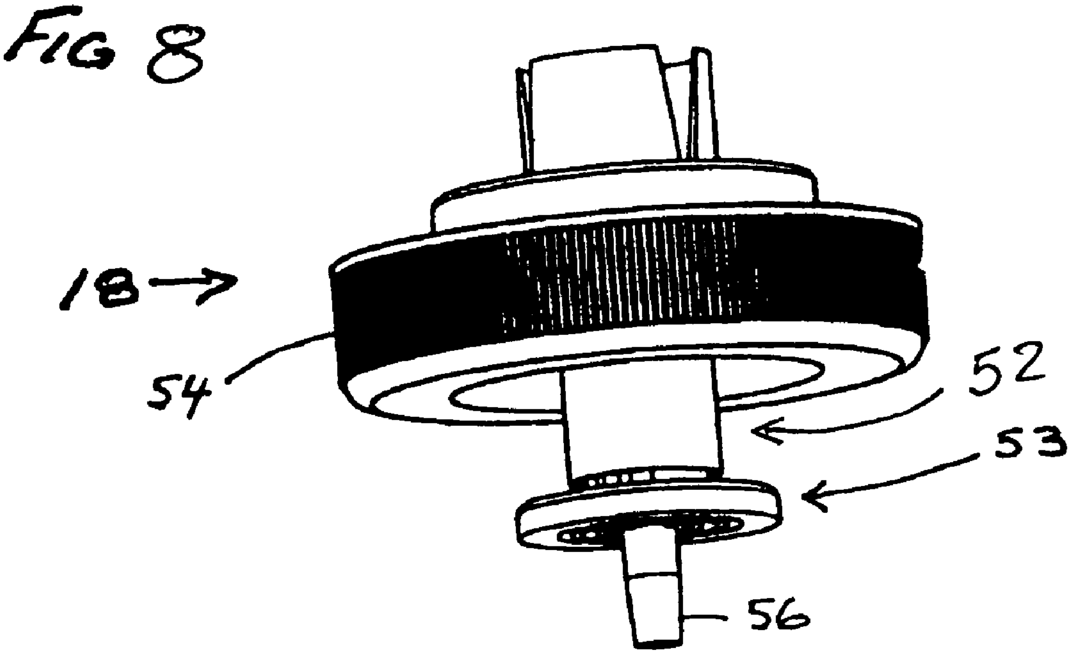
FIG. 8 is a perspective view of a first embodiment of a pump mechanism of the dispenser of FIG. 1.
Figure 9:
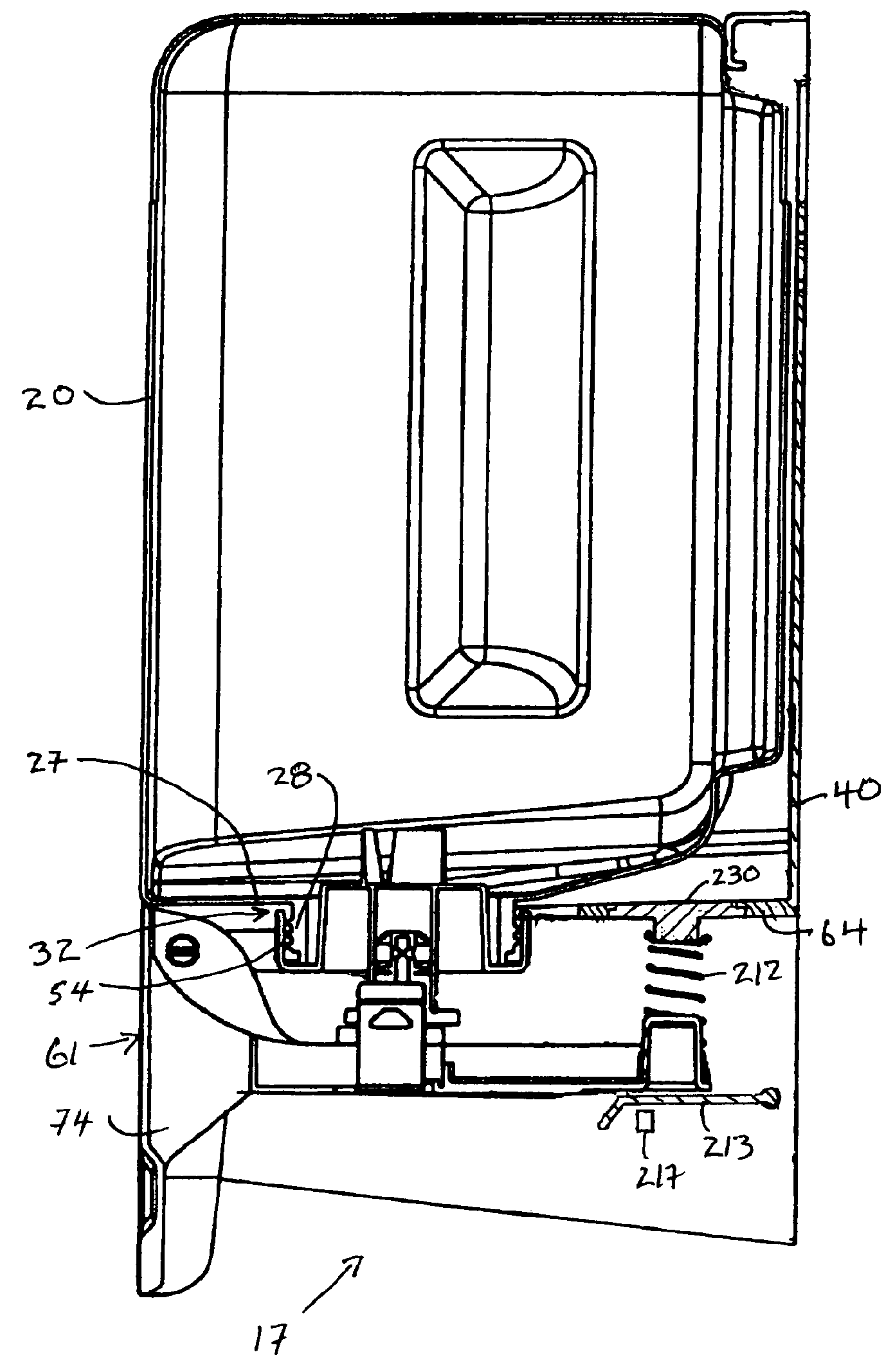
FIG. 9 is a schematic cross-sectional side view of the dispenser of FIG. 1.

The pump mechanism 18 comprises a piston chamber forming element 52 and piston member 53 as seen in FIG. 8. The piston chamber-forming element 52 is sealably engaged in the exit outlet 30 in the bottle 20 with an internally threaded flange 54 threadably engaging the threaded neck 28 of the bottle 20 to locate the piston chamber-forming element 52 coaxially within the neck 28. The piston member 53 is axially slidably received in the piston chamber-forming element 52 for axial sliding therein coaxially between an extended position and a retracted position to dispense flowable materials from the bottle 20. When the pump mechanism 18 is coupled to the bottle 20, the flange 54 is spaced a distance from the bottom wall 27 of the bottle so as to provide an annular slotway 32 as seen in FIG. 9 therebetween adapted for coupling of the bottle 20 to the housing member 17.

Figure 4:
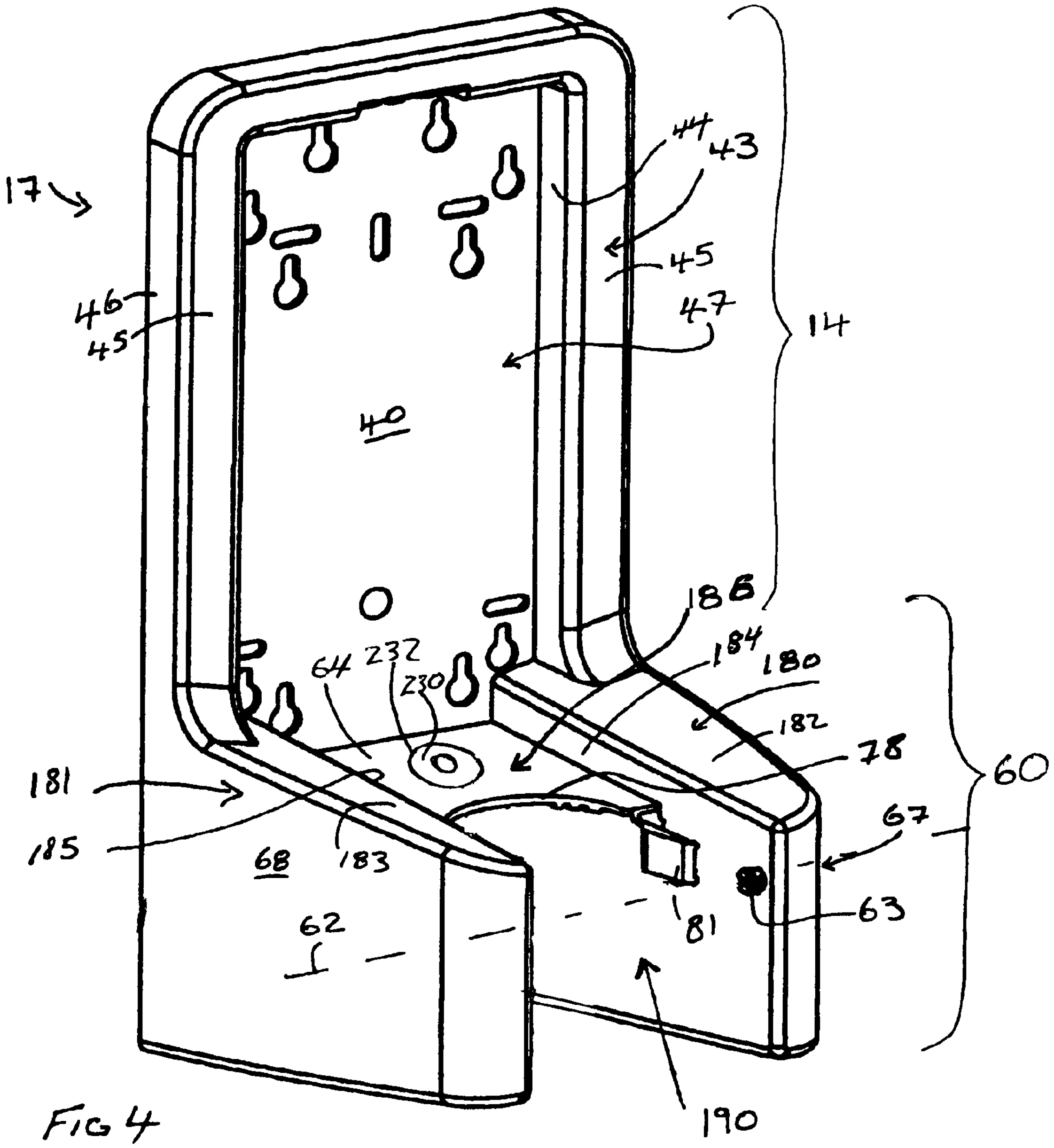
FIG. 4 is a front perspective view of the housing of FIG. 1.
Figure 5:
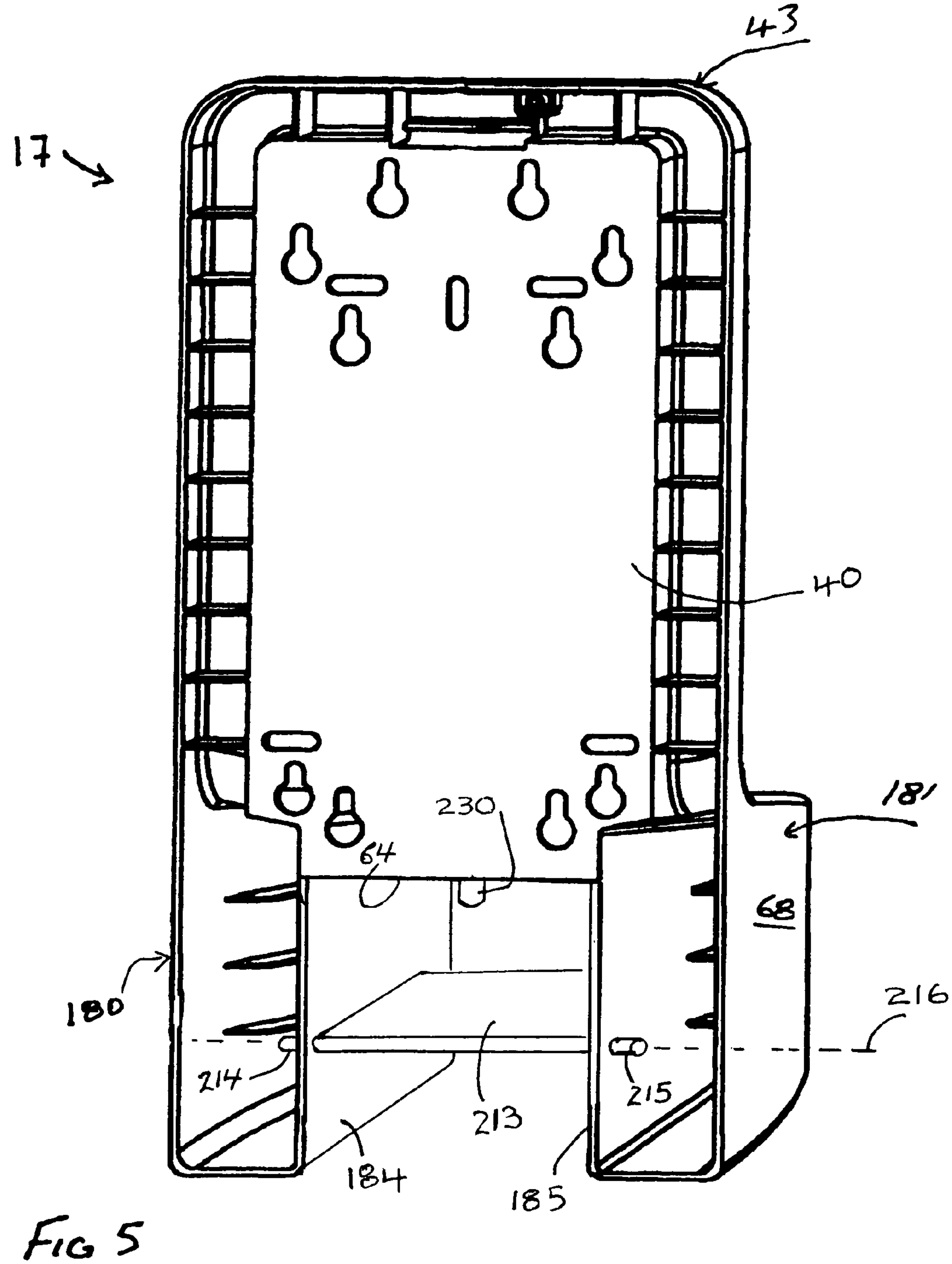
FIG. 5 is a rear perspective view of the housing of FIG. 4.
Figure 6:
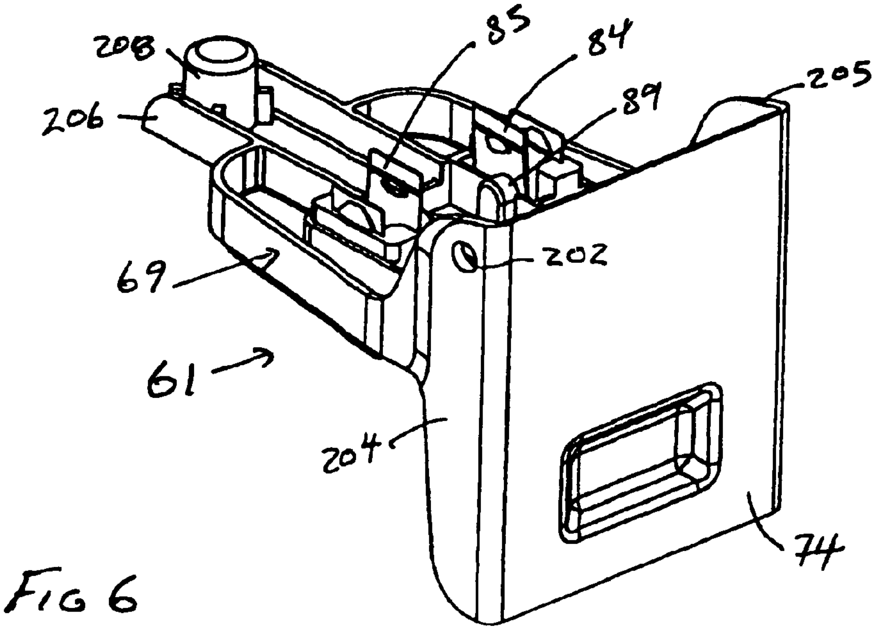
FIG. 6 is a front perspective view of the presser member of FIG. 1.
Figure 7:
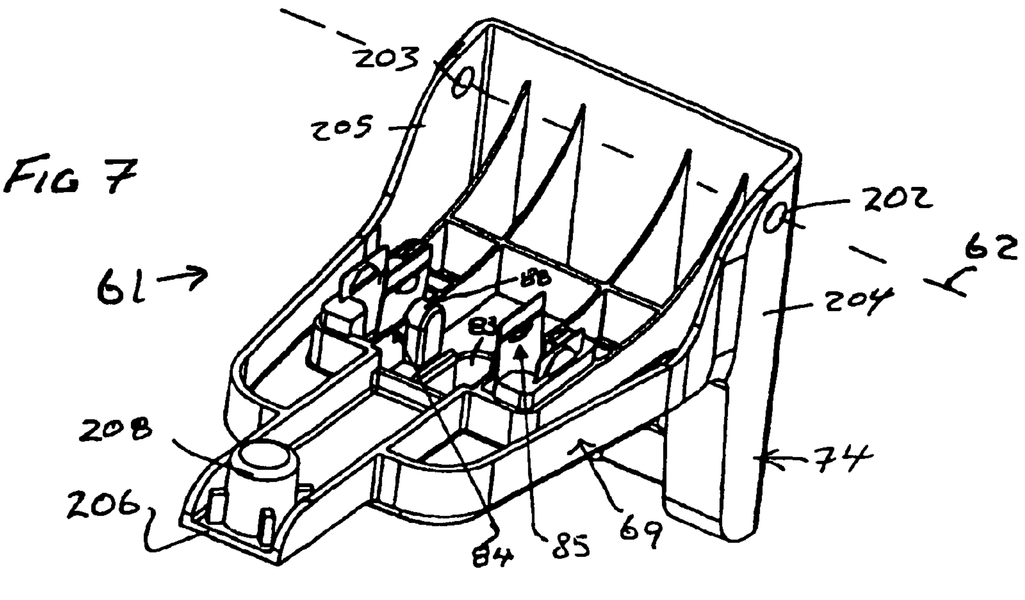
FIG. 7 is a rear perspective view of the presser member of FIG. 6.

As seen in FIGS. 4 and 5, the housing member 17 includes a lower support member 60 which extends forwardly and a wall plate member 14 which extends upwardly from the rear of the support member 60. The wall plate member 14 has a flat rear plate 40 for engagement as, for example, with a washroom wall proximate a sink. A peripheral flange member 43 extends along each side and the upper end of the rear plate 40 having an inwardly directed sidewall 44, a forwardly directed front wall 45 and an outer sidewall 46. A rear cavity 47 is defined between the rear plate 40 and the inner sidewalls 44 of the flange member 43.

Figure 10:
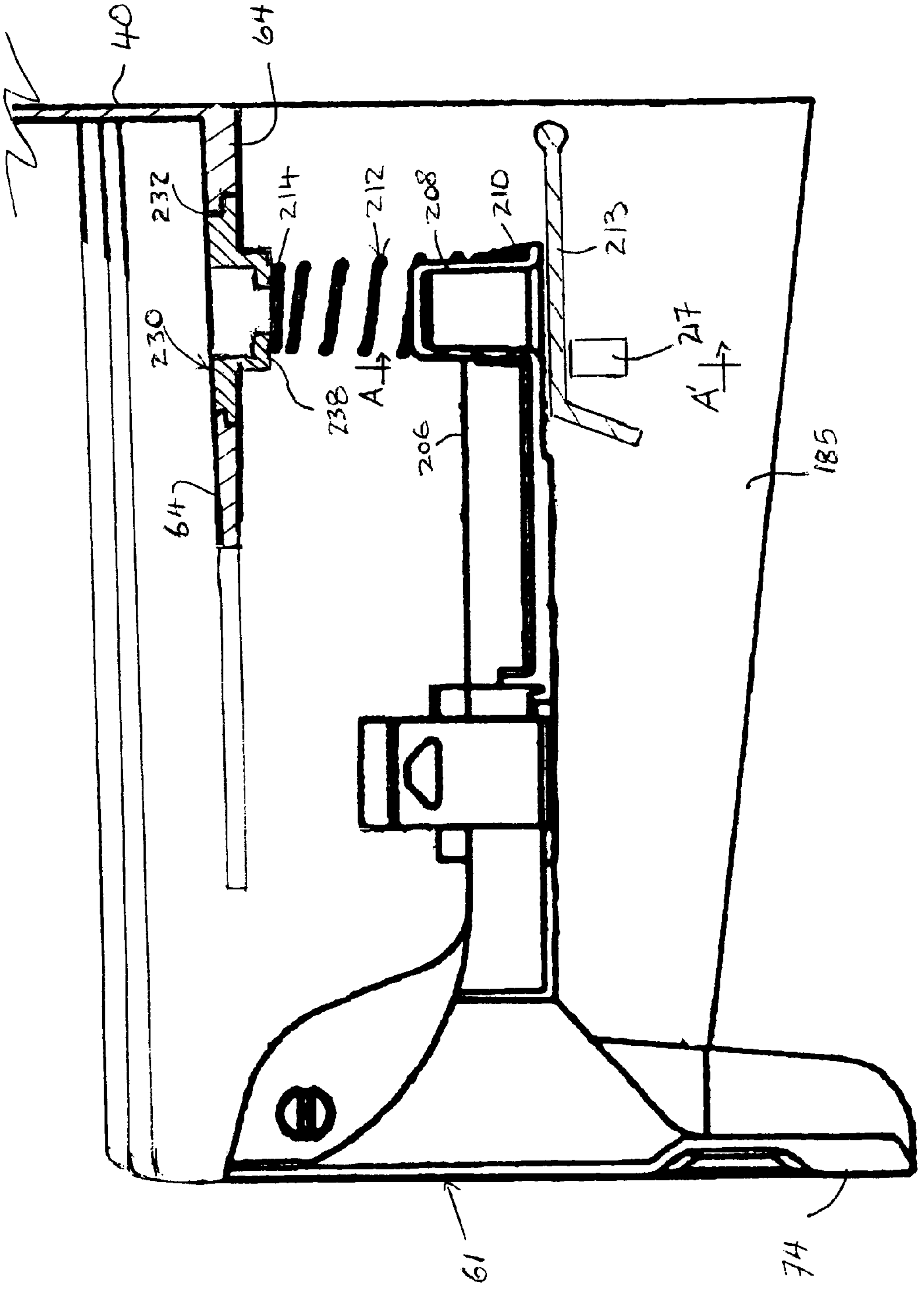
FIG. 10 is an enlarged cross-sectional view of the housing and presser member shown in FIG. 9 in an operative position ready for dispensing.

The support member 60 has sidewall members 180 and 181 which provide exterior sidewalls 67 and 68, upwardly directed top walls 182 and 183 and interior sidewalls 184 and 185. A support shelf 64 extends forwardly from the rear plate 40 between the interior sidewalls 184 and 185. As best seen in FIGS. 5 and 10, the support shelf 64 extends rearwardly to the rear plate 40.

Figure 11:
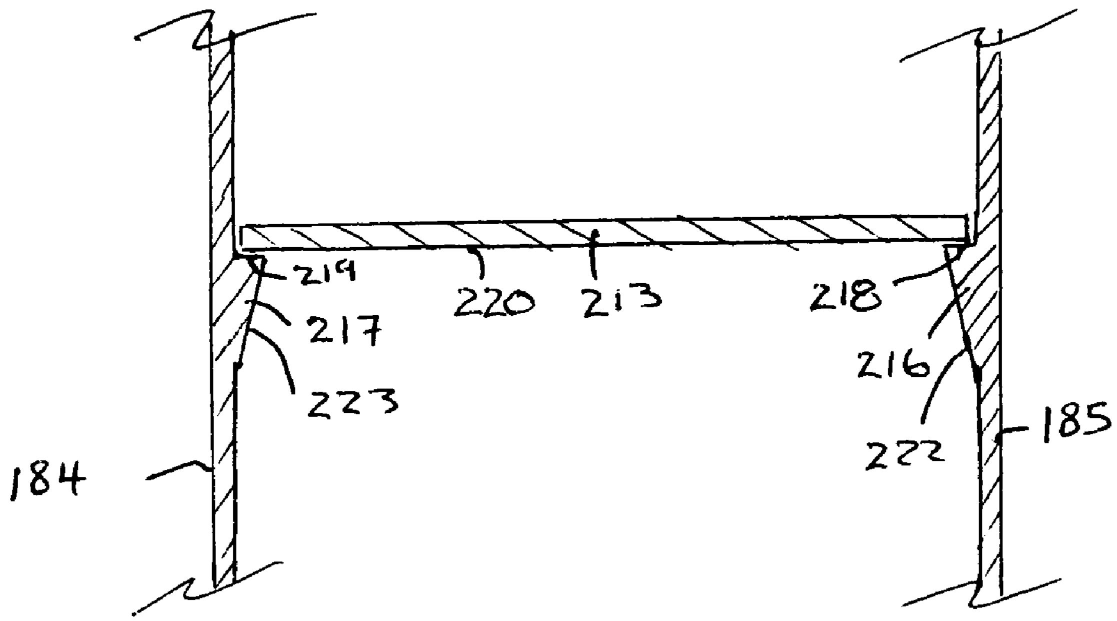
FIG. 11 is a schematic cross-section along section line A-A' in FIG. 10.
Figure 12:
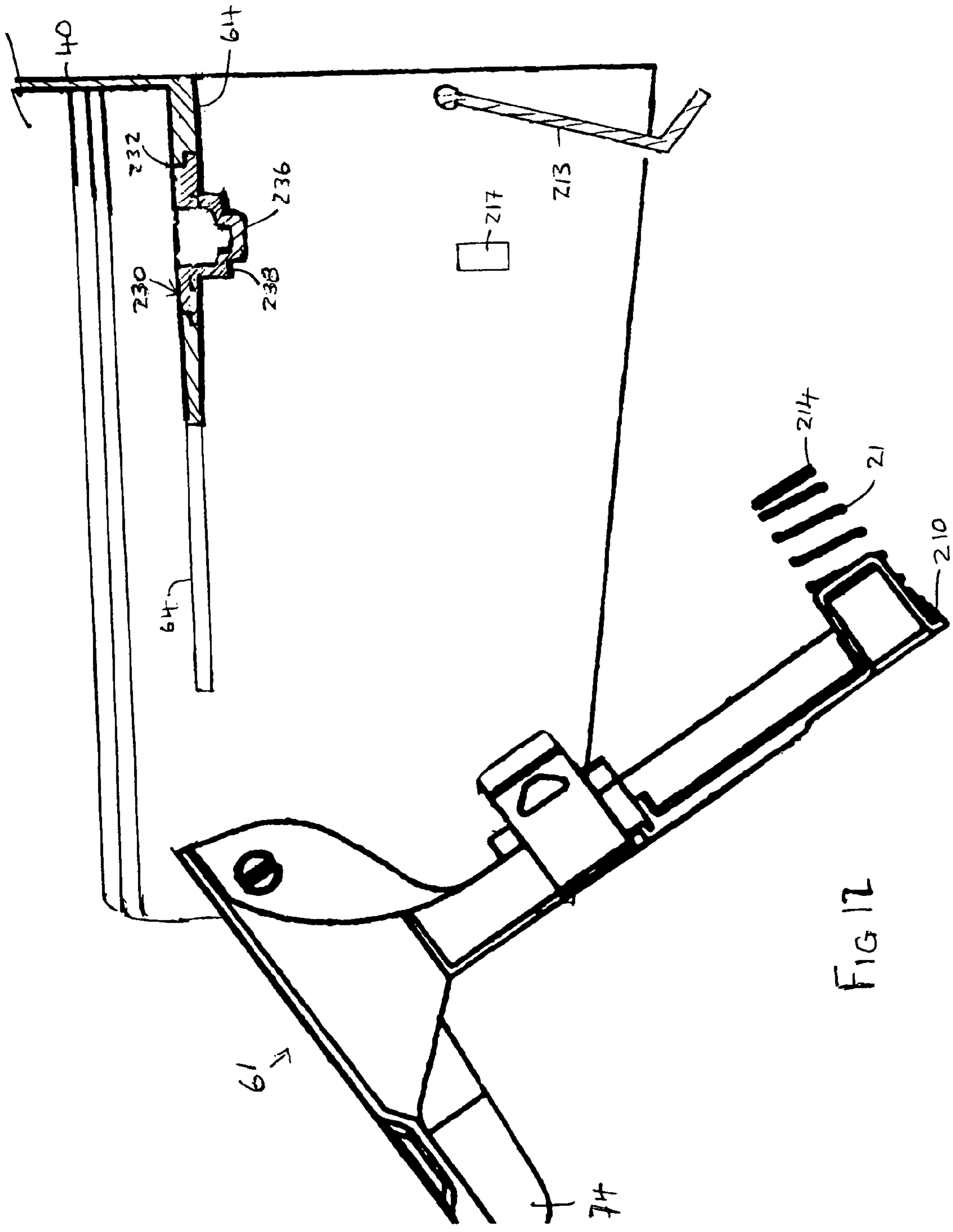
FIG. 12 is a side view of the dispenser and presser of FIG. 10 but in an open inoperative position.

As best seen in FIGS. 5 and 10, a bridging latch member 213 is provided extending sideways between the interior sidewalls 184 and 185 of the support member 60 disposed below the height of the support shelf 64. The latch member 213 has a pair of stub axles 214 and 215 which extend through openings in the interior sidewalls 184 and 185 to journal the latch member 213 to the interior sidewalls 184 and 185 for pivoting about a horizontal axis 216. As seen in FIG. 10, a resilient catch member 217 is provided on the inner face of the interior sidewall 185. FIG. 11 schematically, in a vertical cross-section, illustrates latch member 213, the catch member 217 on sidewall 185 and a similar catch member 216 on sidewall 184. Each of the catch members 216 and 217 have respective upwardly directed catch shoulders 218 and 219 to engage an under surface 220 of the latch member 213 and hold the latch member 213 in a latched or closed position as illustrated in FIG. 10 against movement downwardly. By applying manual laterally outwardly directed forces to the interior sidewalls 184 and 185, the sidewalls 184 and 185 may be deflected outwardly so that the catch members 216 and 217 are laterally clear of the latch member 213 and the latch member 213 may be pivoted from its closed position as shown in FIGS. 5 and 10 to an unlatched or open position as shown in FIG. 12. Each of the catch members 216 and 217 have a respective downwardly and inwardly directed cam surface 222 and 223 which, on manually pivoting of the latch member 213 upwardly from the open position of FIG. 12 to the closed position of FIG. 10, permits the latch member 213 to urge the catch members 216 and 217 laterally out of the way.

As seen in FIG. 4, above the support shelf 64, the upper support shelf 64 and the interior sidewalls 184 and 185 define a bottom locating cavity 186 closed at the rear by the rear plate 40. The upper support shelf 64 of the support member 60 has a forwardly directed generally semicircular edge 78. Two resilient fingers 81 carried on the interior sidewalls 184 and 185 extending forwardly from the support shelf 64 on either end of the edge 78. The edge 78 opens forwardly into a central slotway 190 provided between the two sidewall members 180 and 181.

The bottle 20 is shaped and sized to fit within the housing member 17 and to be coupled thereto by being moved downwardly and then moved rearward by relative sliding. The flange 54 of the piston chamber-forming element 52 of the pump mechanism 18 is to be coupled in a snap-fit relation to the support member 60 with the support shelf 64 received in the slotway 32 about the neck 28 of the bottle 20 between the rear wall 22 of the bottle and the flange 54 of the pump mechanism 18 and with the resilient fingers 81 engaging in vertical ribs on the flange 54. The bottom locating plug 200 of the bottle 20 is received in the bottom locating cavity 186 and the rear locating plug 193 is to be received in the rear locating cavity 47. Engagement of the sidewalls of the rear locating plug 193 with the inner sidewalls 44 of the flange member 43 about the rear locating cavity 47 and engagement of the sidewalls of the bottom locating plug 200 with the interior sidewalls 184 and 185 of the side members 180 and 181 about the bottom locating cavity 186 assist in guiding the bottle 20 and the pump mechanism 18 in rearward sliding into engagement with the housing member 17.

The presser member 61 is pivotally coupled to the support member 60 of the housing member 17 for pivoting about a hinge axis 62 by reason of two stub axles 63 extending inwardly from each of the sidewalls 184 and 185 of the support member 60 being received within pivot openings 202 and 203 in sidewalls 204 and 205 of the presser member 61. The presser member 61 includes a front hand lever 74 which extends downwardly from the hinge axis 62 and a support shelf 69 which extends rearwardly from the hand lever 74. The support shelf 69 includes a rearwardly extending control arm 206 which carries an upwardly directed post 208. As seen in FIG. 10, a lower end 210 of a helical coil spring 212 is engaged on this post 208 and extends upwardly therefrom to an upper end 214 to engage with an annular support flange 238 of a spring seat member 230 carried on the underside of the support shelf 64 of the support member 60.

As best seen in FIG. 4 and in cross-section in FIG. 10, the support shelf 64 has a spring opening 232 therethrough within which the spring seat member 230 is secured as in a snap-fit relation. The spring seat member 230 is removably secured in the spring opening having in a preferred embodiment illustrated in FIG. 10 an annular stepped shoulder permitting the spring seat member 230 to be removably coupled to the support shelf 64 by being moved upwardly from under the support shelf 64 into the spring opening 232 in which it is to be received in a snap friction fit. The spring seat member 230 includes a downwardly extending post 236 best seen in FIG. 12 with the annular flange 238 thereabout. The post 236 serves to engage inside the upper end 214 of the coil spring 212 for seating the coil spring 212 upon the shoulder 238. As seen in FIG. 10, with the bridge member 213 secured in the closed position, the spring 212 is compressed between the spring seat member 230 and the post 208 on the arm 206 urging the presser member 61 downwardly into the bridge member 213 to an extended position. From this extended position, a user may manually apply rearwardly directed forces to the lower end of the lever 74 pivoting the presser member 61 about the hinge axis 62 and urging the central arm 206 upwardly compressing the spring 212 and moving the presser arm 61 towards a retracted position. On release, the bias of the spring 212 will urge the presser member 61 to assume the extended position as is limited by the latch member 213.

Figure 13:
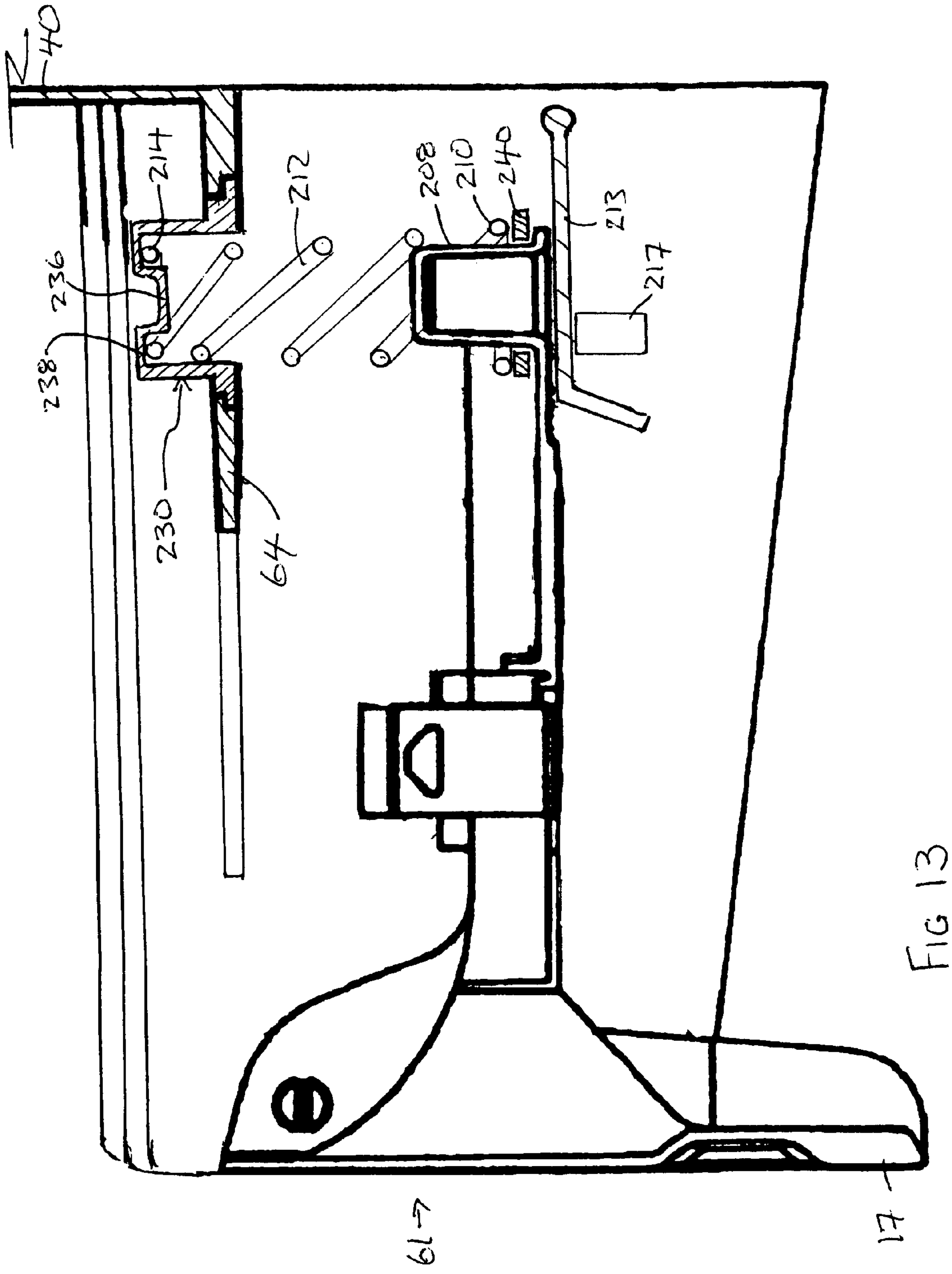
FIG. 13 is a side view the same as FIG. 10 but showing the use of a substitute spring seat member.

FIG. 12 illustrates a condition in which the bridge member 213 has been unlatched and pivoted to a downwardly extending open position. With the bridge member 213 moved to this open position, the presser member 61 can be pivoted about the hinge axis 62 to an inoperative open position as shown with the spring 212 having become disengaged from the seat spring member 230. In this open position, the spring seat member 230 can be disengaged from the support plate 64 as by urging the spring seat member 230 downwardly. The spring seat member 230 may be replaced by a different spring seat member as illustrated in FIG. 13. The spring seat member 230 shown in FIGS. 10 and 11 has been replaced in FIG. 12 by an alternate spring seat member 230 having a post 236 disposed at a different distance relative to the lower surface of the support plate 64. In the case of FIG. 13, the flange 238 supporting the upper end 214 of the spring is disposed above the support plate 64. In FIG. 13, with the same helical coil spring 212 being used as in FIG. 10, the force required to move the presser member 61 from the initial extended position as shown in FIG. 13 will be less than that as compared to FIG. 10.

The helical coil spring 212 has the first end 210 and the second end 214. A helical coil spring 212 has an inherent tendency to assume a set length wherein it is uncompressed. On compression of the helical coil spring 212 to have a length between its ends less than its inherent length, the spring is compressed against its inherent bias. The force required to compress the coil spring increases with increased reduction in the length of the coil spring when the spring 212 is a typical helical coil spring. In accordance with the present invention, a plurality of different spring seat members 230 may be provided, each locating the upper end 214 of the coil spring 212 at a different height relative to the support member 64. Thus, by replacing and removing the spring seat member 230, the force required for a user to move the pressure member 61 from an extended to a retracted position may be varied as may be appropriate having regard to the nature of different fluids which may be dispensed and the nature of different pumps which may be utilized.

The embodiments illustrated in FIGS. 10 to 13 show an arrangement in which the spring seat member 230 is adapted to be removed by downward movement relative to the support plate. This is not necessary and the spring seat member 230 may be removed and replaced by various other movements such as horizontal sliding and/or rotation. The seat spring member 230 may be arranged so as to be insertable from above the support shelf 64 downwardly through the support shelf as, for example, by having a bayonet-type coupling which permits coupling by rotation of the spring seat member 230 a certain amount.

The spring seat member 230 may have its annular stop flange 238 engage the upper end 214 of the spring 212 at different heights by relative manipulation of the spring seat member 230. For example, the spring seat member 230 could be adapted to assume one or more different bayonet conditions or to be threadably engaged with the support plate 64 such that relative rotation of the spring seat member 230 will locate the stop flange 238 for the upper end 214 of the spring 212 at different heights relative to the support plate 64.

Figure 14:
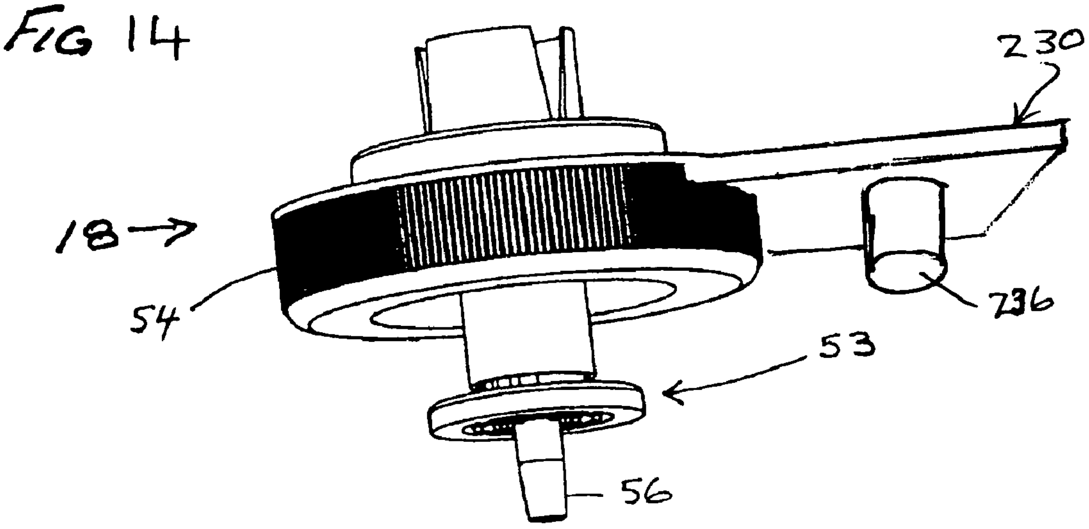
FIG. 14 is a perspective view similar to FIG. 9 but of a second embodiment of a pump mechanism carrying a spring seat member.
Figure 15:
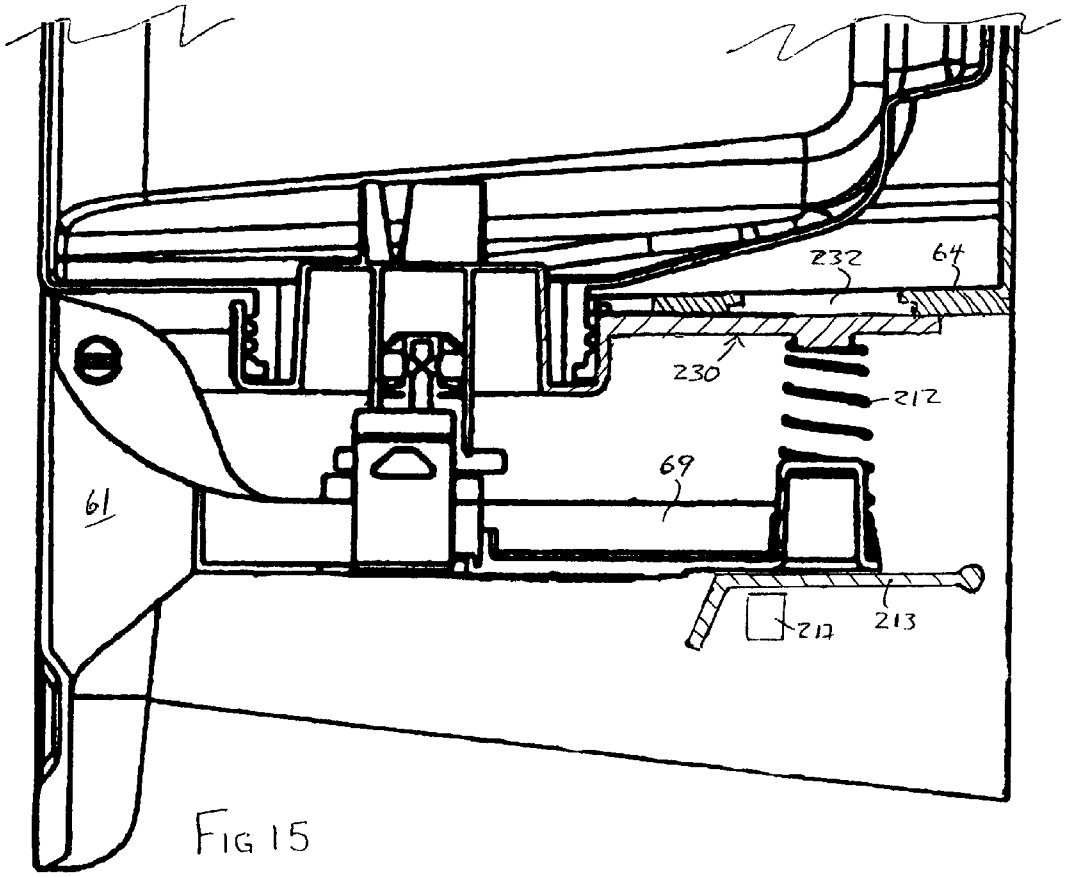
FIG. 15 is a schematic cross-sectional side view similar to FIG. 9 but showing use of the second embodiment of the pump mechanism shown in FIG. 14.

Reference is made to FIGS. 14 and 15. As seen in FIG. 14, a second embodiment of a pump mechanism 18 is shown in which a spring seat member 230 is carried on the pump mechanism 18 as an integral portion of the rotatable collar 54 of the piston chamber-forming element 52.

With the presser member 61 in the open configuration as shown in FIG. 12 and with the spring seat member 230 removed, on inserting a removable reservoir assembly comprising the bottle 20 and the pump mechanism 18 onto the housing member 17 by movement first downwardly and then sliding rearwardly, the spring seat member 230 is slid rearwardly so as to cover and overlie the spring opening 232 and locate the spring seat member 230 with its post 236 directed downwardly ready to receive the upper end 214 of the spring 212. Subsequently, the presser member 61 is pivoted from its open position to at least its extended position and the bridge member 213 is then pivoted to its latched position to prevent the presser member 61 from pivoting downwardly beyond the extended position.

In accordance with the embodiment illustrated in FIGS. 14 and 15, removal of the dispensing unit 12 may be accommodated as by moving the latch member 213 to an unlatched position, moving the presser member 61 downwardly towards the open position sufficiently that the upper end 214 of the spring 212 disengages from the spring seat member 230, and then sliding the reservoir assembly forwardly such that the spring seat member 230 is removed with the pump mechanism 18.

In each of the embodiments illustrated, the spring opening 232 is sized and located such that if there is not a spring seat member 230 received in the spring opening 232, the dispensing unit 12 will not operate. In this regard, the upper end 214 of the spring 212 will preferably pass through the spring opening 232 and not engage the support plate 64 and thus the presser member 61 will not be biased to return from a retracted position toward the extended position. Preferably, the bottle 20 is configured such that the inner end 214 of the spring 212 will not engage any surface which will compress the spring 212. This has the advantage that in the context of an arrangement such as shown in FIG. 15, if a replaceable reservoir assembly comprising the bottle 20 and pump mechanism 18 is attempted to be used which does not carry a spring seat member 230, then the dispensing unit will not be able to dispense fluid. This can be advantageous, for example, to prevent the unauthorized use of a removable reservoir assembly of a bottle 20 and/or pump mechanism 18 which is not desired for use with the housing 17.

The embodiment illustrated in FIGS. 14 and 15 can be provided to have differently configured spring seat members 230 which locate the upper end 214 of the spring 212 at different relative positions compared to the support member 64. This permits the resistance of a spring to deflection to be modified depending upon the removable reservoir assembly which may be applied. For example, if very thick fluid is to be provided in the bottle 20, it may be desired that the spring pressure to return the presser member 61 to the extended position be greater than if a lower viscosity fluid is provided in the bottle 20.

The spring 212 is preferably a relatively inexpensive helically coiled metal spring. This is not necessary, however, and the spring 212 may comprise almost any spring member whose spring pressures will change with a change in length of the spring. The spring need not be a helical coil spring and may be a spring such as a leaf spring or some other form of a coil spring which may have changing resistance characteristics with compression or expansion. With any spring, however, the relative change in the location of one of the upper end 214 of the spring 212 and the lower end 210 of the spring 212 can be used to accommodate changes in the spring force characteristics by changing of a spring seat member.

The preferred embodiment shows the spring opening 232 as extending through the support plate 64 so as to preferably prevent use of the dispenser in the absence of a spring seat member 230 being provided. This is not necessary as it could be appreciated that the spring seat member 230 could, in one instance, comprise the support member 64 itself with the length of the spring to be lessened by providing a removable spring seat member in the form a shim or extension to be placed on the support plate 64 which extends the distance that the inner end 214 of the spring 212 is located relative to the support plate 64. The support plate 64 thus might have its own integrally formed downwardly extending post and a removable spring seat member might comprise a washer-like extension or shim which fits over that post and provides a shoulder surface to locate the upper end of the spring at a greater distance from the support plate 64.

In accordance with the preferred embodiments, the spring seat member 230 is carried on the support plate 64. It is to be appreciated, however, that a removable spring seat member 230 may also be carried on the presser member 61. For example, as shown in FIG. 13, a washer-like annular member 240 is provided annualarly about the post 208 on the central arm 206 of the presser member 61 and serves, in effect, as a removable spring seat member which can be removably coupled to the presser member 61 for adjusting the location relative the presser member 61 that the lower end 210 of the spring 212 is located and the extent to which the spring 212 is compressed in the extended position. A spring seat member could be provided on the presser member 61 in addition to or in substitution for any spring seat member 230 carried on the support plate 64.

In the embodiment of FIG. 15, with the presser member 61 in the open position as, for example, shown in FIG. 12, the dispenser unit 12 may be slid rearwardly to an engaged position on the support plate 64 with the spring seat member 230 in an appropriate position. On initial pivoting of the presser member 61 from the open position to the retracted position, not only does the upper end 214 of the spring 212 come to be engaged on the spring seat member 230 but, in addition, catch fingers 84 and 85 on the presser member 61 will come to engage the piston member 53.

In respect of the embodiment illustrated in FIG. 15, preferably, the piston chamber-forming element 52 may be coupled to the bottle 20 in a manner which places the piston chamber-forming element 52 in a desired orientation relative to the bottle 20 such that the spring seat member 230 may be located at a desired location once the bottle 20 is properly located relative to the housing 17. Of course, relative interactive guide or camming arrangements can be provided on the under surface of the support plate 64 for engaging with the spring seat member 230 as it may be slid rearwardly and guiding the spring seat member 230 into a desired position relative the support plate 64.

The piston chamber-forming element 52 may preferably be secured to the bottle 20 against removal without damaging the bottle 20 or the piston chamber-forming element 52 with the pump mechanism 18 being provided so as to prevent unauthorized refilling of the bottle 20 when the piston chamber-forming element 52 is secured to the bottle 20. This can prevent refilling and re-use of the removable reservoir assembly as by refilling.

Figure 16:
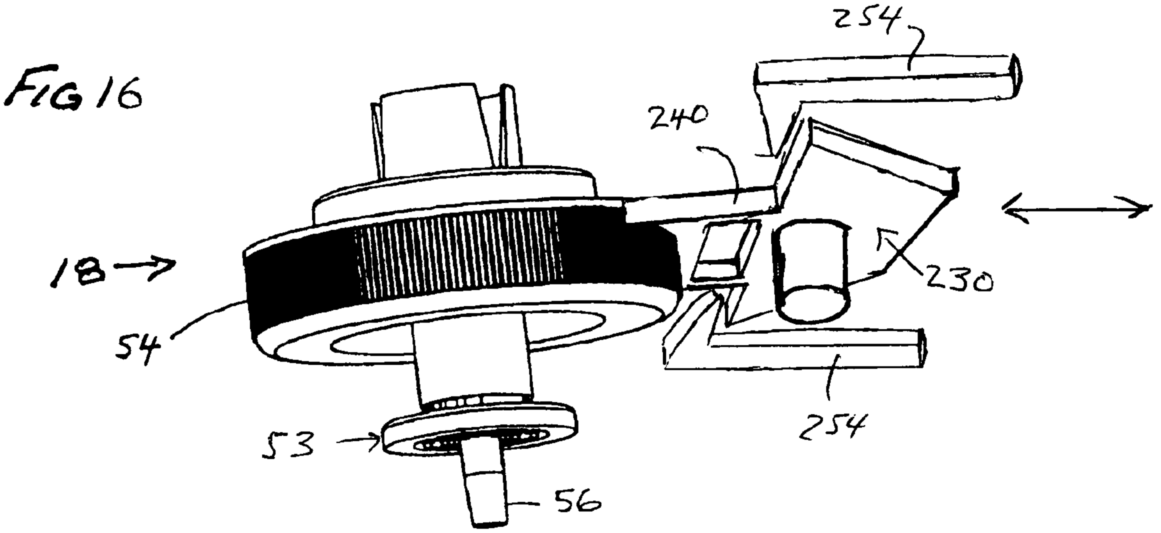
FIG. 16 is a perspective view similar to FIG. 14 but of a third embodiment of a pump mechanism carrying a spring seat member.

Reference is made to FIG. 16 which shows a third embodiment of a pump mechanism 18 as illustrated in FIGS. 14 and 15 but with the spring seat member 230 coupled to the piston chamber-forming element 52 by two frangible connections 250 useful to provide for the removal of the removable reservoir assembly to result in breaking of the frangible connections 240 thus severing the spring seat member 230 from the remainder of the piston chamber-forming element 52. FIG. 16 illustrates the spring seat member 230 as integrally formed with the piston chamber-forming element 52, however, is joined to the flange 54 thereto by the two thin frangible portions 250. With the presser member 61 moved to the open position as shown in FIG. 12, removal of the removable reservoir assembly from the housing 17 is to cause the engagement of hook members 254 carried on the housing 17 to engage the spring seat member 230 such that by the application of manual force as necessary to remove the reservoir assembly, the spring seat member 230 may become broken away from the piston chamber-forming element 52. Preferably, the spring seat member 230 is broken away from the piston chamber-forming element 52 at a position in which the spring seat member 230 has been moved forwardly and out of a position in which it covers the spring opening 232. Preferably, a non-frangible tether strap 258 might continue to secure the spring seat member 230 to the piston chamber-forming element 52 such that the spring seat member 230 is removed with the piston chamber-forming element 52 by reason of the tether strap yet the spring seat member 230 is broken from the piston chamber-forming element 52 in a manner that prevents reinsertion of the reservoir assembly with the spring seat member 230 to cover the spring opening or be suitably located relative to the spring 212.

Reference is made to FIGS. 17 and 18. A seen in FIG. 17, a third embodiment of a pump mechanism 18 is shown in which a spring seat member 230 is carried on the pump mechanism 18 as an integral portion of the rotatable collar 54 of the piston chamber forming element 52. As seen in FIG. 18, the support shelf 64 is provided with a closing plug 302 which closes the spring opening 232 and preferably provides the support shelf 16 to have its under surface as relatively flat horizontal continuous surface. In FIG. 18, while not necessary, the bridge pivotable member 213 of the embodiment shown in FIG. 10 has been replaced by a T-shaped beam 313 which is secured to permanently extend between the side walls 184 and 185.

The spring seat member 230 is provided within a U-shaped arm member 306 which extends radially from the rotatable collar 54. As best seen in FIG. 18, a U-shaped slotway 304 is provided between two legs 308 and 310. The slotway 204 opens radially away from the collar 54 to an opening 312 and extends towards the collar 54 between the legs 308 and 310 providing interior side walls to the slotway 304. The floor of the slotway provides inwardly from the opening 312 and towards the blind end of the slotway the spring seat member 230 as a surface which is disposed parallel to the under surface of the support plate 64. A camming ramp portion 314 extends from the spring seat member 230 to the opening 312 of the slotway 304 decreasing in thickness to having substantially negligible thickness at the opening 312 to the slotway. In the embodiment to FIG. 18, with the bottle 20 and its pump mechanism 18 removed, the spring 212 will have its upper end 214 engage on the under surface of the closure plug 302 supported by the support shelf 64. On inserting the removable reservoir assembly comprising the bottle 20 and the pump mechanism 18, the collar 54 and its arm member 306 come to be aligned such that the slotway 304 of its arm member 306 is aligned with the spring 212 and with rearward sliding of the collar 54 the are member 306 comes to receive the spring 212 between its legs 306 and 310 in the opening 312 of the slotway 204. Subsequently further rearward sliding of the collar 54 will cause the camming ramp portion 314 to engage the upper end 214 of the spring 212 and slide above the upper end 214 of spring 212 between the upper end 214 of the spring 212 and the support shelf 64 until the upper end 214 of the spring 212 comes to underlie the spring seat member 230 with the spring seat member 230 spacing the upper end 214 of the spring 212 at a desired height relative to the support shelf 64.

In the embodiment of FIGS. 17 and 18 the pump mechanism 18 may be provided with collars 54 carrying differently configured arm members 306 as for example with the relative distance that the spring seat member 230 spaces the upper end 214 of spring 212 from the support plate 64 to vary. As well it is to be appreciated that in the context of the embodiment of FIG. 18, with the closing plug 302 in place, a pump mechanism as shown in FIG. 8 may be utilized without the arm member 306 insofar as the plug member 302 when received in the spring opening 232 serves as the spring seat member. As well in the embodiment illustrated in FIGS. 17 and 18 the support shelf 64 as need not be provided with the spring opening 230.

Figure 19:
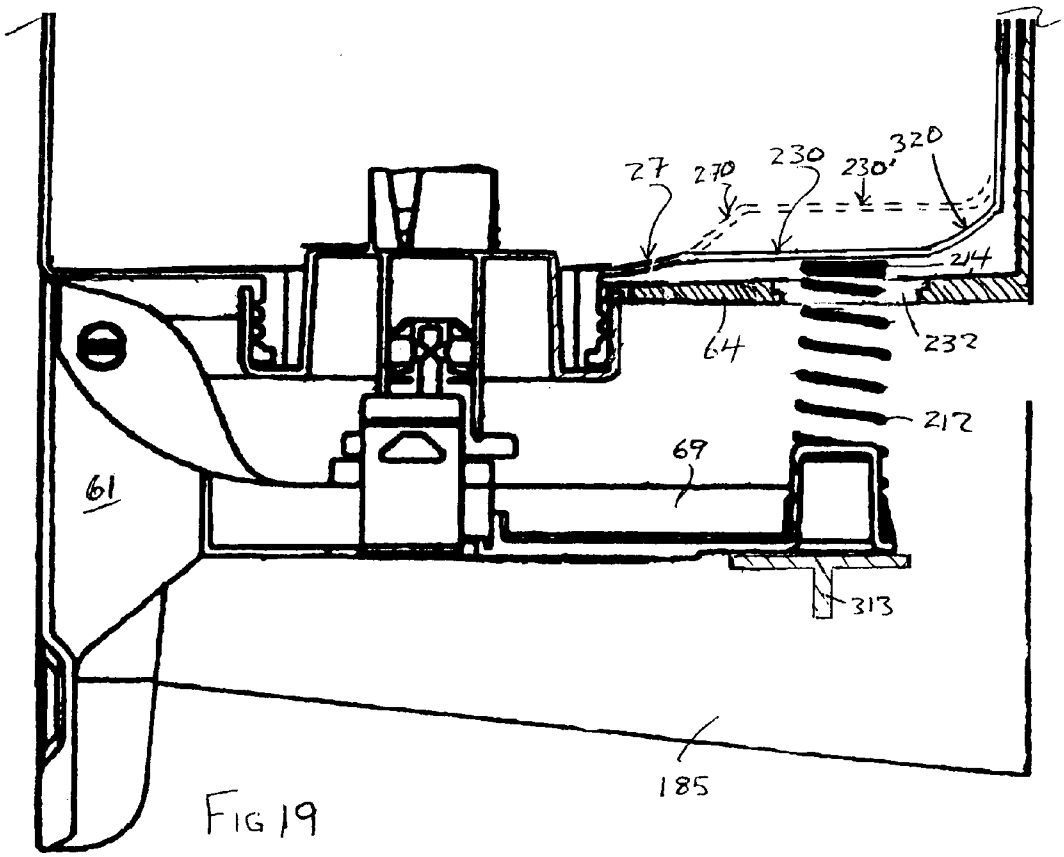
FIG. 19 is a schematic cross-sectional side view similar to FIG. 18 but showing an embodiment with the bottle providing the seat spring member.

Reference is made to FIG. 19 which illustrates an arrangement similar to that in FIG. 18 however in which the spring opening 230 is provided through the support shelf 64 and in which the bottom wall 27 of the bottle 20 provides the seat spring member 230. As seen in FIG. 19, the spring 212 extends upwardly through the support shelf 64 via the spring opening 230 with the upper end 214 of the spring 212 to engage the spring seat member 230 provided as a portion of the bottom wall 27. Rearward of spring seat member 230, a camming portion 320 of the bottom wall 27 is provided rearwardly from the spring seat member 230 such that on the bottle 20 being slid rearwardly, the camming portion 320 will first engage the upper end 214 of the spring 212 and with rearward sliding of the bottle 20 urge the upper end 214 of the spring 212 downwardly so that with successive sliding the upper end 214 of the spring 212 come to engage with the spring seat member portion 230.

FIG. 19 illustrates in solid lines the bottom wall 27 as forming the spring seat member 230. Other bottles 20 may be configured to have the bottom wall 27 with the spring seat member 230 at different heights relative to the support shelf 64. FIG. 19 illustrates in dashed lines an alternative location for the bottom wall 270 so as to provide the spring seat member 230 at a different height relative to the support shelf 64.

In the embodiment of FIG. 19, the spring seat member 230 preferably comprises but an integral portion of the bottom wall 27 of the bottle 20. By variation of the configuration of the bottom wall 27 the spring seat member 230 may be provided at different locations relative to the support shelf 64. Rather than make differently configured bottles 20, it would be possible to provide the bottle 20 so as to receive a removable spring seat member to be coupled to the bottle 20 and thus specifically configure a standard bottle 20 so as to have a spring seat member 230 disposed at different relative heights compared to the support shelf 64. Generally providing a separate element to the bottle 20 is not considered preferred as additional elements generally increase costs.

Figure 20:
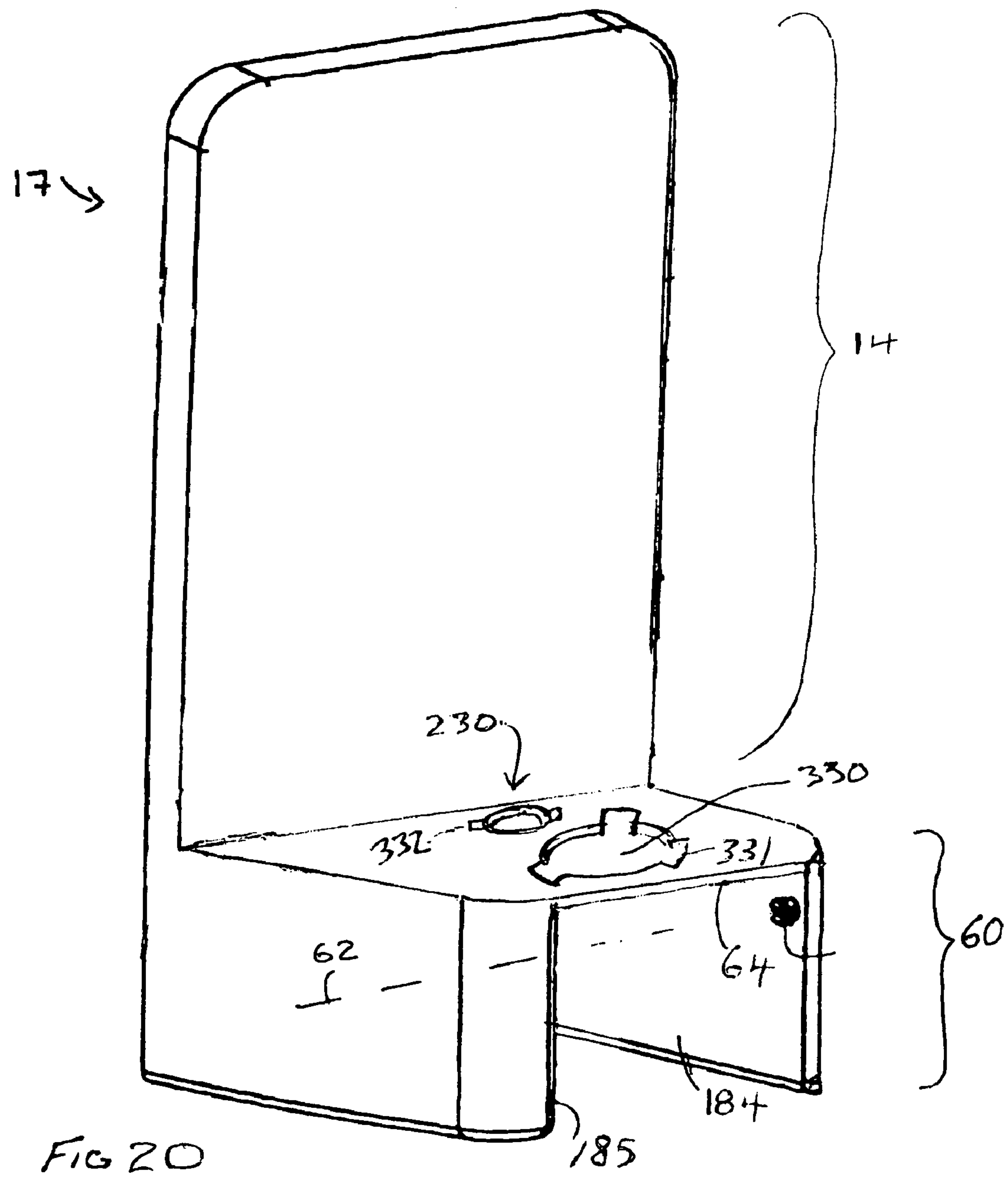
FIG. 20 is front perspective view similar to FIG. 4 but of a second embodiment of a housing.

Reference is made to FIG. 20 which schematically illustrates a front perspective view of an alternate housing member 17. The housing member 17 in FIG. 20 differs notably from the housing shown in the embodiments in FIGS. 1 to 19 in that it is adapted for coupling of the removable reservoir assembly by downwards sliding. In FIG. 20, the support shelf 64 shown to be generally horizontal. A generally circular opening 330 is provided therethrough through which the pump mechanism 18 is to pass. Rearward of the opening 330 there is provided the spring opening 230. The opening 330 is provided to have a configuration of the simple bayonet coupling as with 3 circumferentially spaced radially outwardly extending and axially extending key ways 331. While not shown in the drawings, the flange 54 of the pump mechanism 18 is intended to carry similarly shaped lugs such that by vertically downward movement of the flange member 54 and the relative rotation of the flange member 54 to a small extent, in a known bayonet type connection the reservoir assembly may become coupled to the housing 17 after downward movement of the reservoir assembly relative to the housing 17. With the bottle 20 provided with its bottom wall 27 to have suitable spring seat member 230 disposed vertically above the spring 212 which extends upwardly through the spring opening 230, on vertical downward movement of the reservoir assembly, the bottle 20 and its spring seat member 230 comes to engage to upper end 214 if the spring 212 suitably compressing the spring 212 to the desired manner.

While a bayonet typed coupling is described, with reference to FIG. 20 is to be appreciated with many different mechanism including catch mechanisms and the like may be provided such that vertical downward movement of the reservoir assembly may couple the reservoir assembly to the housing 17.

In the embodiment in FIG. 20, an activation member similar to that shown in the first embodiment of FIG. 1 as 16 is intended be used.

In the embodiment of FIG. 20 it would be possible to insert a removable seat member 232 downwardly into the spring opening 230. In this regard in FIG. 20, the spring opening 230 is also provided with a bayonet type fitting arrangement with two diametrically opposed radially outwardly axially extending slots 332 adapted to receive complimentary radially outwardly extending lugs on a spring seat member 230 of the type shown at FIGS. 10 and 12 but modified for insertion downwardly from above the spring opening and thus avoid the need for example for the bridge member 213 to be releasable.

By providing such removable bridge members 230 to engage the upper end 214 of the spring 212 at different heights, the spring force can be adjusted. By use of such spring seat members 230 such as in FIG. 10 or the stop plug in FIG. 18 in the embodiment of FIG. 20 the upper end 214 of the spring 212 may readily be disposed at a height at or below the support plate 64. Additionally, as illustrated in FIG. 20, a spring seat member 230 need not be provided coupled in the spring opening 230 and to conveniently permit the upper end 214 of the spring 212 to be disposed above the height the support plate 64, the spring 212 may be permitted to engage a spring seat member 230 carried as part of the bottom wall 27 of the bottle 20 as shown in FIG. 19. With any particular embodiment such as shown in FIG. 20, a wide variety of spring support members 230 may be utilized without necessarily having each spring seat member be the same or have the same configuration.

The preferred embodiment illustrates but a few arrangements of a housing 17 with a removable reservoir assembly. A reservoir assembly may be adapted for removal from a housing in a number of manners such as by merely sliding movement whether forwardly or rearwardly or at an angle or vertically downwardly. The reservoir assembly might be engageable with the housing through a combination of vertical movement, sliding rearward and/or pivoting. The manner of engagement of the presser member 61 and the pump mechanism 18 may vary widely.

The presser member 61 is but one embodiment of an activation unit designed to activate the pump mechanism 18 and cause operation of the unit with pivoting. An activation unit may, however, merely incorporate a sliding motion relative to the housing as, for example, illustrated in the applicant's U.S. Pat. No. 5,431,309 to Ophardt, issued Jul. 11, 1995. The movement of the activation unit is to be resisted by the bias of a spring and spring seat members may be provided at either end of the spring to adjust the force the spring applies.

The preferred embodiments illustrate arrangements in which manually applied forces pushing the lever 74 forwardly compress the spring 212 to cause the desired operation. It is appreciated that manual forces may be similarly applied by pulling rearwardly on a lever as with a spring in a different location to be compressed or at the same location to be extended against its bias.

The use of spring seat members may also be used in an automated dispenser in which a motor may work against a return spring for dispensing.

The presser member 61 in the preferred embodiments is pivotally mounted to the support member 60 for pivoting between an extended position in which the rear end 206 of the support shelf 69 engages the bridge member 230 and retracted positions. Movement from the extended position to the retracted positions is accomplished by a user pressing rearwardly on a lower portion of the hand lever 74 compressing the spring 210. On release, the bias of the spring 210 will return the presser member 61 to the extended position.

The shelf 69 of the presser member 61 carries an elongate opening 83 through which the nozzle 56 of the piston member is to extend. On either side of the opening 83, the shelf 69 carries two resilient piston catch fingers 84 and 85 which are to engage the engagement flange 57 of the piston member 53 to couple the piston member 53 for movement with the presser member 61. The catch fingers 84 and 85 each carry a downwardly facing catch shoulder and to engage an upper surface of the engagement flange 57. The shelf 69 also has two upwardly extending arms on either side of the openings 83 presenting arcuate pivot shoulders 88 and 89 adapted to engage the lower surface of the engagement flange 57. Engagement flange 57 is to be received between the catch shoulders and the pivot shoulders 88 and 89 such that with arcuate movement of the presser member 61 relative the support member 60, the piston member 59 may slide in linear fashion relative the support member 60 axially relative the piston chamber forming member 52.

The catch fingers 84 and 85 are resilient and adapted to be deflected away from each other so as to permit the engagement flange 76 of the piston member 53 to move pass their distal ends such that after the bottle 20 and pump mechanism 18 have been secured to the support member, the piston member 61 may be pivoted towards the support member 60 and the distal ends of the catch fingers 84 and 85 will engage the side or lower surfaces of the engagement flange 57 and be biased apart such that catch fingers 84 and 85 will come to be disposed with their catch shoulders engaging the upper surface of the engagement flange 57.

In use, the presser member 61 is coupled to the housing member 17 and this housing subassembly is then secured to a wall. The pump mechanism 18 is threadably engaged onto the bottle 20 and this sub-assembly, herein referred to as the reservoir assembly, is then coupled to the housing sub-assembly. For coupling, the reservoir assembly is placed into engagement with the housing sub-assembly and the neck 28 of the bottle 20 with the pump mechanism 18 is inserted vertically down into the slotway 190 in front of opening 78 and a rear portion of the bottom locating plug 193 is disposed in a forward portion of the bottom locating cavity 186 forward from the rear plate 40. The bottle subassembly is then slid rearwardly. With rearward sliding movement of the lower portion of the bottle 20 and the pump mechanism 18 carried thereon, the reservoir assembly comes to be securely coupled to the support member 60 by reason of the support shelf 64 being received in the slotway 32 and by reason of the flange 54 being received between the resilient fingers 81 which deflect outwardly to permit the flange 54 to enter in a snap-fit relation with the resilient fingers 81 resisting movement of the flange 54 and hence the reservoir assembly outwardly from the seated position in which the flange 54 is coaxially received within the rear semicircular portion of the edge 78.

At the same time that the bottle 20 and flange 54 become engaged in the seated position with the support member 60, the piston member 53 may come to become engaged with the presser member 61 with the engagement flange 57 of the piston member 53 becoming engaged with or disposed in a position for secured engagement between the catch fingers 84 and 85 and the pivot shoulders 88 and 89 and with the nozzle 56 aligned with the opening 83 through the shelf 69 of the presser member 61.

The bottle 20 is preferably a substantially collapsible and vented or non-collapsible, substantial rigid container preferably formed by plastic as for example by blow moulding which may be vented.

The nature of the fluid which may be dispensed by the bottle is not limited and may comprise any substantially flowable material including liquids, fluids, solutions, pace and as well a flowable solid and particulate matter where venting to provide an air passageway can be advantageous.

The preferred embodiment shows arrangements for providing substitute spring spacer members on the housing. Similar such substitute, replaceable spring spacer members may be provided on the activation member that is the activation member 16, as for example to accommodate a spring opening therethrough which can receive different spring spacer members.

The preferred embodiments show arrangements with the spring 212 disposed about a vertical axis. A similar spring may be disposed about a horizontal axis, for example with the presser member having a suitable vertically disposed surface. Orientation of the spring to be horizontal can assist compression of the spring by sliding the removable reservoir assembly horizontally for coupling and uncoupling.

While the invention has been described with reference to the preferred embodiments many variations and modifications will now occur to persons skilled in the art. For a definition of the invention reference is made to the following claims.

I claim:

1. A dispensing system comprising:

a housing member, an activation member mounted to the housing member to be reciprocally movable relative the housing member between a first position and a second position, a reservoir assembly coupled to the housing member including a reservoir containing material to be dispensed, a pump mechanism including a pump element coupled to the activation member and reciprocally movable with the activation member in a cycle of operation between an extended position and a retracted position to dispense the material from the reservoir assembly, a spring member separate from the pump mechanism disposed between the housing member and the activation member biasing the activation member from the first position toward the second position and resisting movement of the activation member from the second position toward the first position, the spring member being elongate and extending between a first end of the spring member coupled to the housing member and a second end of the spring member coupled to the activation member, the spring member having a length measured longitudinally of the spring member along a spring longitudinal between the first end and the second end, the spring member having an inherent bias to assume an inherent length and to resist deflection by forces applied between the first end and the second end along the spring longitudinal, the relative forces applied between the first end and the second end along the spring longitudinal which are required to change the length of the spring member a given amount varying as the length of the length of the spring member changes, a spring seat member selected from one or more of:

(a) a first housing spring seat member carried on the housing member disposed between the housing member and the first end of the spring member to engage the first end of the spring member and couple the first end of the spring member at a first housing distance along the spring longitudinal relative the housing member, the first housing spring seat member removably coupled to the housing member for replacement by another second housing spring seat member carried on the housing member disposed between the housing member and the first end of the spring member to engage the first end of the spring member and couple the first end of the spring member at a second housing distance along the spring longitudinal relative the housing member which second housing distance is different than the first housing distance, and (b) a first activation spring seat member carried on the activation member disposed between the activation member and the second end of the spring member to engage the second end of the spring member and couple the second end of the spring member at a first activation distance along the spring longitudinal relative the activation member, the first activation spring seat member removably coupled to the activation member for replacement by a similar second activation spring seat member carried on the activation member disposed between the activation member and the second end of the spring member to engage the second end of the spring member and couple the second end of the spring member at a second activation distance along the spring longitudinal relative the activation member which second activation distance is different than the first activation distance.

2. A dispensing system as claimed in claim 1 wherein:

the second housing distance is different than the first housing distance, such that by replacing the first housing spring seat member by the second housing spring seat the relative forces applied between the first end and the second end along the longitudinal which are required to change the length of the spring member are varied for the same relative movement of the activation member relative the housing member, and the second activation distance is different than the first activation housing distance, such that by replacing the first activation spring seat member by the second activation spring seat the relative forces applied between the first end and the second end along the spring longitudinal which are required to change the length of the spring member are varied for the same relative movement of the activation member relative the housing member.

3. A dispensing system as claimed in claim 1 wherein:

(a) if a housing spring seat member is not coupled to the housing member then the first end of the spring member will not to engage the housing member at a distance along the spring longitudinal relative the housing member useful to for the spring member to resist deflection with relative forces which meet predetermined levels, and (b) if an activation spring seat member is not coupled to the activation member then the second end of the spring member will not to engage the activation member at a distance along the spring longitudinal relative the activation member useful to for the spring member to resist deflection with relative forces which meet predetermined levels.

4. A dispensing system as claimed in claim 2 wherein:

(a) the housing member having a housing spring opening coaxially in line with the axis of the spring member through which the first end of the spring member will extend, wherein if a housing spring seat member is not coupled to the housing member, the first end of the spring member does not become engaged relative the housing member, and (b) the activation member having a activation spring opening coaxially in line with the axis of the spring member through which the second end of the spring member will extend, wherein if a activation spring seat member is not coupled to the activation member, the second end of the spring member does not become engaged relative the activation member.

5. A dispensing system as claimed in claim 1 wherein the spring seat member comprises a housing spring seat member.

6. A dispensing system as claimed in claim 5 wherein:

the reservoir assembly is removably coupled to the housing member for replacement by a similar reservoir assembly, the reservoir assembly carrying the spring seat member, wherein in coupling of the reservoir assembly to the housing member the spring seat member becomes coupled and removing the reservoir assembly from the housing member the spring seat member becomes removed.

7. A dispensing system as claimed in claim 6 wherein the reservoir assembly carrying the pump element.

8. A dispensing system as claimed in claim 1 wherein:

the reservoir assembly is removably coupled to the housing member for replacement by a similar reservoir assembly, the reservoir assembly carrying the pump element.

9. A dispensing system as claimed in claim 8 wherein:

the reservoir assembly having an outlet, a piston chamber forming element coupled to the outlet of the reservoir assembly, the piston chamber-forming member defining a chamber therein in communication with material in the reservoir assembly, the pump element comprises a piston element reciprocally movable in the chamber to dispense the material from the reservoir assembly out a discharge outlet, the housing spring seat member carried by one of the reservoir assembly and the piston chamber forming element.

10. A dispensing system as claimed in claim 8 wherein:

the housing spring seat member coupled to the reservoir assembly by a frangible connection member, a catch member carried by the housing member to engage the frangible connection member on coupling of the reservoir assembly to the housing, the catch member engaging the frangible connection member wherein in removal of the reservoir assembly the frangible connection member is severed separating the housing spring seat member from the reservoir assembly.

11. A dispensing system as claimed in claim 5:

the housing member having a housing spring opening coaxially in line with the axis of the spring member, the spring member removably coupled in the opening.

12. A dispensing system as claimed in claim 5 wherein the reservoir assembly moving in a direction parallel to the spring axis for coupling to the housing member, the spring seat member disposed normal to the spring axis for movement parallel the spring axis with coupling of the reservoir assembly to engage and compress the spring member.

13. A dispenser as claimed in claim 12 where in the housing spring seat member comprises a portion of the reservoir assembly.

14. A dispenser as claimed in claim 9 wherein:

the spring seat member comprises a housing spring seat member, the reservoir assembly is removably coupled to the housing member for replacement by a similar reservoir assembly, the reservoir assembly carrying the spring seat member, wherein in coupling of the reservoir assembly to the housing member the spring seat member becomes coupled and removing the reservoir assembly from the housing member the spring seat member becomes removed, the housing spring seat member carried by the piston chamber-forming element.

15. A dispenser as claimed in claim 2 wherein:

the activation member comprising a lever member having a pivoted end and a remote end, the pivoted end of the lever member mounted to the housing for pivoting about a lever axis between the first position and the second position, the spring member disposed between the housing member and the lever member biasing the lever member to pivot about the lever axis between the first position and the second position, the second end of the spring member in engagement with the lever member proximate the remote end of the lever member, the pump element coupled to the lever member at a location on the lever member intermediate the lever axis and the second end of the spring member.

16. A dispenser as claimed in claim 15 wherein:

the pump mechanism further includes a piston chamber-forming member defining a chamber therein, the chamber in communication with material in the reservoir assembly, the piston chamber forming element coupled to an outlet of the reservoir assembly, the pump element comprising a piston element coaxially reciprocally slidable in the chamber to dispense the material from the reservoir assembly out a discharge outlet.

17. A dispensing system as claimed in claim 15 wherein:

(a) if a housing spring seat member is not coupled to the housing member then the first end of the spring member will not to engage the housing member at a distance along the spring longitudinal relative the housing member useful to for the spring member to resist deflection with relative forces which meet predetermined levels, and (b) if an activation spring seat member is not coupled to the activation member then the second end of the spring member will not to engage the activation member at a distance along the spring longitudinal relative the activation member useful to for the spring member to resist deflection with relative forces which meet predetermined levels.

18. A dispensing system as claimed in claim 15 wherein:

(a) the housing member having a housing spring opening coaxially in line with the axis of the spring member through which the first end of the spring member will extend, wherein if a housing spring seat member is not coupled to the housing member, the first end of the spring member does not become engaged relative the housing member, and (b) the activation member having a activation spring opening coaxially in line with the axis of the spring member through which the second end of the spring member will extend, wherein if a activation spring seat member is not coupled to the activation member, the second end of the spring member does not become engaged relative the activation member.

* * * * *